United States Patent [19]

Nguyen

[11] Patent Number: 5,230,084
[45] Date of Patent: Jul. 20, 1993

[54] SELECTIVE CALL RECEIVER HAVING EXTENDED BATTERY SAVING CAPABILITY

[75] Inventor: Tuan K. Nguyen, Boca Raton, Fla.

[73] Assignee: Motorola, Inc., Schaumburg, Ill.

[21] Appl. No.: 623,633

[22] Filed: Dec. 6, 1990

[51] Int. Cl.⁵ ............................................. H04B 1/16
[52] U.S. Cl. .................................. 455/38.3; 455/343
[58] Field of Search .................. 455/32, 38, 228, 343, 455/32.1, 38.1, 38.3; 370/50, 95.3; 348/825.44

[56] References Cited

U.S. PATENT DOCUMENTS

| | | | |
|---|---|---|---|
| 4,663,623 | 5/1987 | Lax et al. | 455/343 |
| 4,839,639 | 6/1989 | Sato et al. | 455/343 |
| 4,914,649 | 4/1990 | Schwendeman et al. | 370/50 |
| 4,961,073 | 10/1990 | Drapac et al. | 455/38 |
| 5,001,471 | 3/1991 | Snowden et al. | 455/343 |

FOREIGN PATENT DOCUMENTS

| | | |
|---|---|---|
| 57-41044 | 6/1982 | Japan . |
| 57-41045 | 6/1982 | Japan . |
| WO88/05248 | 7/1988 | PCT Int'l Appl. . |

OTHER PUBLICATIONS

"A Standard Code for Radiopaging" published by the British Post Office, London, England, Jul. 1979.

*Primary Examiner*—Reinhard J. Eisenzopf
*Assistant Examiner*—Edward Urban
*Attorney, Agent, or Firm*—Philip P. Macnak; William E. Koch; Thomas G. Berry

[57] ABSTRACT

A method and apparatus for providing extended battery saving operation in a conventional selective call signaling protocol, such as the POCSAG signaling protocol includes the transmission of an ordered batch identifier code word in the first frame following a preamble transmission. Upon detection of the ordered batch identifier code word, those selective call receivers capable of extended battery saving operation would supply power to the receiver only during those batches assigned to the receiver group to which the selective call receiver belongs, such as for every second or fourth batch transmission. The method for providing extended battery saving capability is transparent to conventional selective call receivers operating within the system.

15 Claims, 7 Drawing Sheets

SELECTIVE CALL RECEIVER HAVING EXTENDED BATTERY SAVING CAPABILITY

BACKGROUND OF THE INVENTION

1. Field of the Invention

This invention relates generally to a selective call communication system providing receiver battery saving capability, and more particularly to a selective call receiver having extended battery saving capability in a communication system utilizing a synchronous signaling protocol.

2. Description of the Prior Art

There are numerous communication systems in use today which utilize a variety of signaling protocols to provide battery saving functions for battery operated communication receivers. One such prior art signaling protocol is the POCSAG signaling protocol which provides the receiver battery saving capability by transmitting address and message information in batches which are subdivided into a sequence of frames to which selective call receivers are assigned. By assigning the selective call receivers, or pagers, to respond to information transmitted only within a specific frame within a batch transmission, a battery saving function was implemented. In the case of the POCSAG signaling protocol, a one to eight battery saving performance was achieved within the batch transmission time interval.

While such a battery saving function has proven to be advantageous, there are situations where it is desirable to extend the battery saving performance of at least some of the pagers operating within the communication system without altering the basic transmission format of the signaling protocol in use.

SUMMARY OF THE INVENTION

A selective call receiver comprises a means for receiving a signal including a preamble, a first message batch including a sync word, an identification word and message information, and at least another message batch including a sync word and message information, and a means for supplying power to at least a portion of the selective call receivers during at least one of the batches solely in response to the identification word contained in the first message batch transmission.

A selective call message transmission system is provided comprising a paging terminal and transmitter and a plurality of selective call paging receivers designated to operate in at least two groups. The terminal includes a means for designating at least two groups of selective call receivers, a means for ordering the messages intended for the groups of selective call receivers into a sequence of ordered batches for transmission, a means for generating an ordered batch identifier identifying the transmission batch sequence as being ordered, and a means for transmitting the ordered batch identifier with the ordered batch sequence. The plurality of selective call receivers include a means for designating the group to which each of the plurality of selective call receivers belongs, a receiving means, a first means for supplying power to the receiver means for receiving and detecting the transmitted ordered batch identifier, and a second means for further supplying power to the receiver means for receiving the ordered batches of the ordered batch sequence directed to the designated group of selective call receivers, in response to the ordered batch identifier being detected.

A selective call receiver for operation in a communication system transmitting messages for at least two receiver groups in an ordered batch sequence identified by an ordered batch identifier comprises a means for designating one of at least two groups to which the selective call receiver belongs, a receiving means, a means for supplying power to the receiver means for receiving and detecting the transmitted ordered batch identifier, and a means, responsive to the ordered batch identifier, for further supplying power to said receiver means for receiving the batches of the ordered batch sequence directed to the designated group of selective call receivers.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
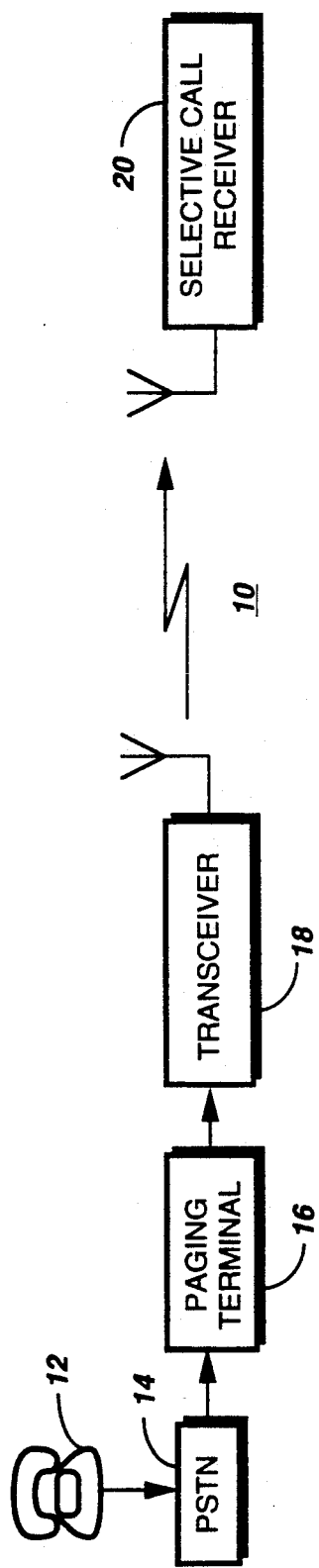
FIG. 1 is a block diagram of a selective call signaling system capable of supporting selective call receivers of the present invention having extended battery saving capability.

FIG. 1 is a block diagram of a selective call signaling system 10 such as can be utilized to provide extended battery saving capability to the selective call receivers of the present invention. Messages are entered into the selective call communication system 10 by a caller using any of a number of well known message entry devices, such as a telephone 12 for voice and numeric data message, or a data entry device for alphanumeric messages. The messages are coupled through the public switched telephone network (PSTN) 14 to a paging terminal 16. The paging terminal 16 processes the received messages in a manner well known in the art for a particular selective call signaling protocol, after which the messages are transmitted throughout the system by one or more transmitters 18 to selective call receivers 20 located throughout the system 10. For purposes of example, the operation of the selective call communication system 10 of the present invention will be described using the well known POCSAG signaling format. However, it will be appreciated from the description to follow that other well known signaling protocols providing synchronous message transmission capability such as in the POCSAG signaling protocol may be utilized as well to provide the extended battery saving capability to the selective call receivers of the present invention.

Figure 2:
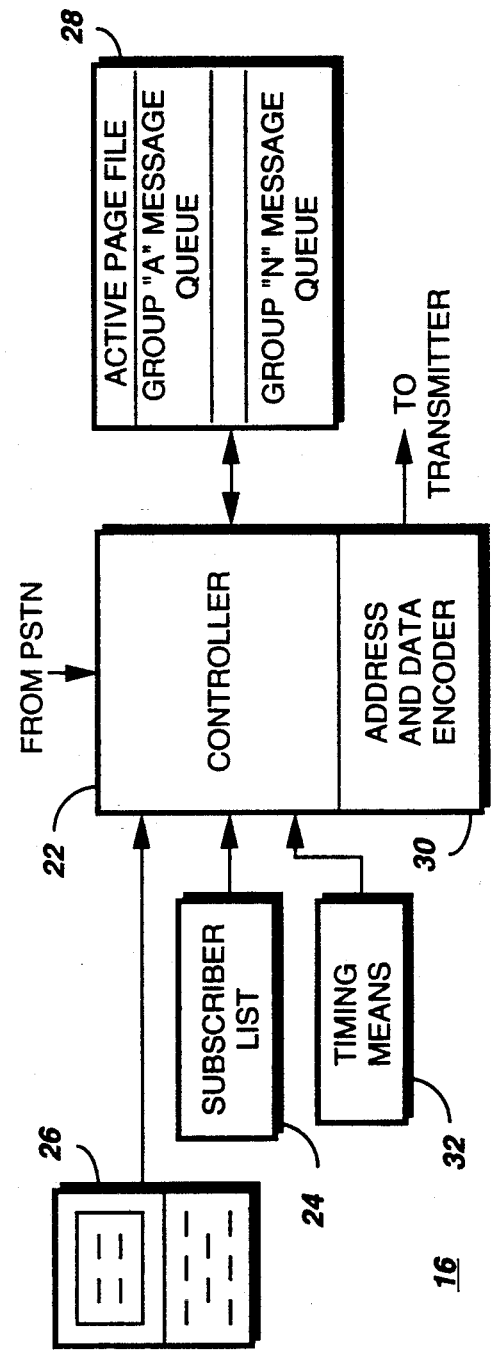
FIG. 2 is a block diagram of a paging terminal suitable for use with selective call receivers of the present invention having extended battery saving capability.

As stated above, after the messages are entered by the caller, the messages are processed by a paging terminal 16. FIG. 2 is a block diagram of a paging terminal 16 suitable for use in the present invention. Paging terminal 16 includes a controller 22 which controls the reception and transmission of messages received over the public switched telephone network 14. Controller 22 is preferably a microcomputer based controller utilizing such microcomputers as a 6809 microcomputer manufactured by Motorola. The operation of such microcomputer based controllers for paging terminals is well known in the art. Coupled to the controller 22 is a subscriber list memory 24 which stores information pertinent to each of the selective call receivers operating within the system. The subscriber list memory provides non-volatile information storage, using such non-volatile information storage devices as hard and soft disk drives or non-volatile random access memories, such as electrically erasable programmable read-only memories (EEPROMs). The subscriber list memory 24 includes such information as the paging receiver address; message type, such as voice, numeric or alphanumeric; address signaling protocol in mixed protocol systems; and battery saving group information.

The battery saving group information stored in the subscriber list memory is a function of the number of battery saving groups established in the system, and is derived from the least significant address bits of each paging receiver address. For addresses encoded in the POCSAG signaling protocol, it will be appreciated the address code word includes a single address/data identification bit (bit 1), followed by an eighteen bit address portion (bits 2-19), a two bit address multiplier (bits 20-21), a ten bit parity portion (bits 22-31), and a single block check bit (bit 32). Thus, the least significant address bit is bit 19 of the address portion of the address code word. When two battery saving groups are established in the system, bit 19 alone designates both battery saver groups. When four battery saver groups are established in the system, bits 18 and 19 designate the four battery saver groups, and so forth, enabling simple battery saving group designations.

A data entry device, such as a video display terminal 26, couples to the controller 22 to provide the system operator control of such functions as entry and alteration of information stored in the subscriber list memory 24, monitoring of the system activity and billing. An active page file memory 28 couples to controller 22, providing temporary storage queues for messages awaiting transmission. The active page file memory generally provides volatile information storage utilizing such volatile memory devices as semiconductor random access memories (RAMs). As will be described in detail below, the active page file memory is partitioned into message queues to provide message storage for paging receivers operating in different battery saver groups. An address and data encoder 30 also couples to controller 22, and provides a means for encoding in the appropriate signaling protocol the message information recovered from the active page file memory. The operation of address and data decoders for particular selective call signaling protocols is well known in the art.

Figure 3:
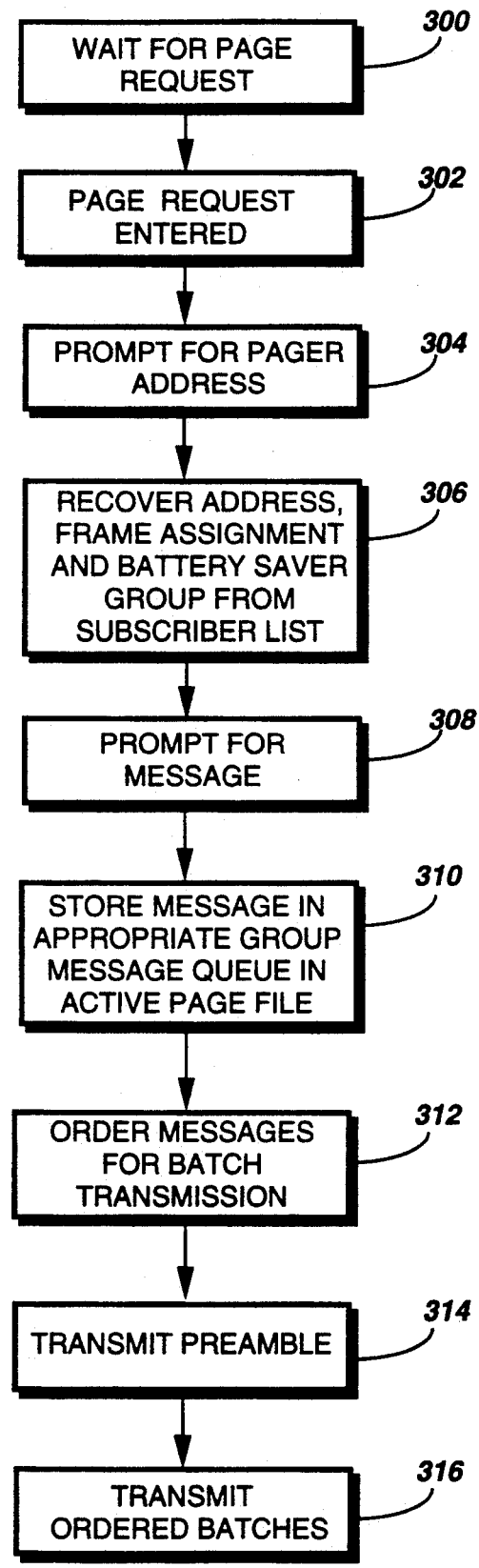
FIG. 3 is a flow chart describing the operation of the paging terminal suitable for use with selective call receivers of the present invention having extended battery saving capability.

The operation of the paging terminal to provide the extended battery saving capability for the selective call receivers of the present invention operating in a conventional signaling protocol communication system is best understood by means of a flow chart of FIG. 3. When a call is not being placed to the paging terminal, the terminal waits for a page request, at step 300, that is, a call from a caller wishing to enter a message. When a caller wishes to send a message, the caller enters a page request, at step 302, by contacting the paging terminal utilizing a telephone or data entry device through the public switched telephone network. The caller is prompted for the pager address to which the message is directed, at step 304. Following the entry of the pager address by the caller, the controller recovers the actual pager address for transmission, battery saver frame assignment information for conventional and extended battery saver paging receivers, and battery saver group information for extended battery saver paging receivers, at step 306, and any other information which is pertinent for message transmission. The caller is then prompted for the message information, at step 308, after which the pager address, pertinent transmission information, and message information is temporarily stored in the active page file memory in the appropriate group message queue, at step 310, for extended battery saver paging receivers, or a current transmission queue for conventional battery saver paging receivers. At a time prior to transmission, the address and message information is recovered from the active page file memory by the controller and encoded for transmission. The controller orders the encoded addresses and associated messages according to battery saver frame assignments for both conventional and extended battery saver paging receivers, orders the address and message information according to battery saver batch assignments for the extended battery saver paging receivers and inserts synchronization code words at the start of each ordered batch, at step 312. The ordered batches are then transmitted by first transmitting a preamble, at step 314, followed by the sequence of ordered batch information which includes the ordered batch identifier code word, at step 316. The number of batches which are transmitted in the ordered batch sequence depends largely on the volume and type of information being transmitted, with larger ordered batch sequences typically being transmitted for large alphanumeric message volumes. In the preferred embodiment of the present invention, a typical ordered batch sequence is forty POCSAG batches in length.

Figure 4:
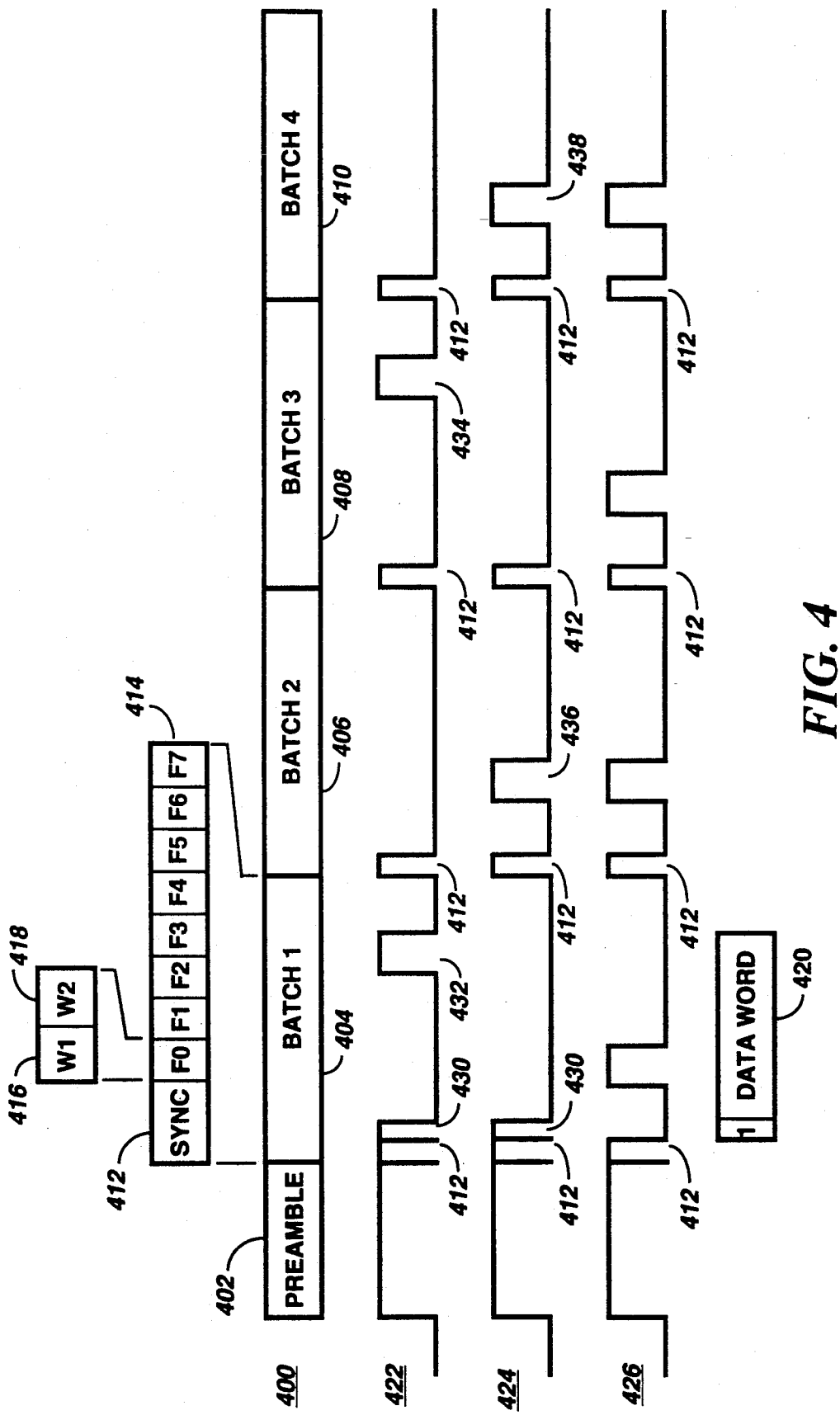
FIG. 4 is a timing diagram describing the operation of the selective call signaling system and receivers of the present invention having extended battery saving capability.

FIG. 4 is a timing diagram describing the ordered batch sequence transmission and the operation of the selective call receivers having improved battery saving performance of the present invention. The ordered batch transmission sequence 400 comprises a conventional POCSAG preamble consisting of an alternating one/zero bit pattern. Ordered batches 404, 406, 408 and 410 follow the preamble 402. It will be appreciated that only four batches are being shown by way of example, and typical ordered batch transmission sequences are larger, as described above. Each ordered batch 404, 406, 408 and 410 comprises a POCSAG synchronization code word, followed by eight frames 414 of address and message information encoded in the POCSAG format, as two address or message code words 416, 418, or combination thereof. The ordered batch transmission sequence is unlike that of a conventional POCSAG transmission sequence, in that the first code word 416 of the first frame following the preamble 402 is a unique POCSAG data code word 420. This first data code word provides an ordered batch identifier which is utilized by those paging receivers having extended battery saver capability to identify the current batch sequence being transmitted as an ordered batch and is ignored by conventional POCSAG paging receivers.

The actual battery saving operation is shown in battery saving waveforms 422 and 424 for the extended battery saving paging receivers of the present invention, and battery saving waveform 426 for a conventional POCSAG paging receiver. At some time period, each of the extended battery saving and conventional POCSAG paging receivers awake to search for the transmission of preamble. In FIG. 4, each paging receiver is shown as awakening at the beginning of the preamble transmission, although in reality, it will be appreciated that such operation does not necessarily occur. Each of the paging receivers remains on throughout the preamble transmission interval searching for the synchronization code word, which is used to establish frame synchronization, at time interval 412. Upon obtaining frame synchronization during time interval 12, the extended battery saving paging receivers remain on to evaluate the first transmitted code word 420 at time interval 430. When the extended battery saving paging receivers detect the ordered batch identifier code word as the first code word, each pager switches to the assigned battery saver group sequence. As shown, the first receiver identified by waveform 422 is assigned to the odd transmission batches, while the second receiver identified by waveform 424 is assigned to the even transmission batches. The first receiver, as a result is energized during batch 1, at time interval 432 and the third batch at time interval 434. The second receiver is energized during batch 2, at time interval 436 and the fourth batch at time interval 438. As shown in waveform 426, the conventional POCSAG paging receiver is not assigned to frame 1, and consequently is energized only during the synchronization code word time interval and for the assigned frame in each transmission batch. The extended battery saving paging receivers are also energized during each of the occurrences of the synchronization code word 412 in all transmission batches. Such operation enables the extended battery saver pagers to regularly maintain frame synchronization, and track batch position by counting the number of frames being transmitted as will be described below. It will be appreciated that reception of the synchronization code word is not required during every subsequent batch in order to maintain frame synchronization and frame counting. It is allowable, for example, to miss up to two synchronization code words while maintaining frame synchronization and counting. The number of allowable missed synchronization code word detections permissible is determined primarily by the timer clock stability and the ability to maintain bit synchronization for proper word decoding.

In summary, when an extended battery saving pager of the present invention detects the ordered batch identifier as the first code word in the first frame following the transmission of preamble, the extended battery saving paging receiver operation switches to track the assigned transmission batches. When the ordered batch identifier code word is not detected as the first code word of the first frame following the preamble, the extended battery saving paging receiver reverts to the conventional battery saving paging operation, thereby insuring no messages intended for the paging receiver are lost.

Figure 5:
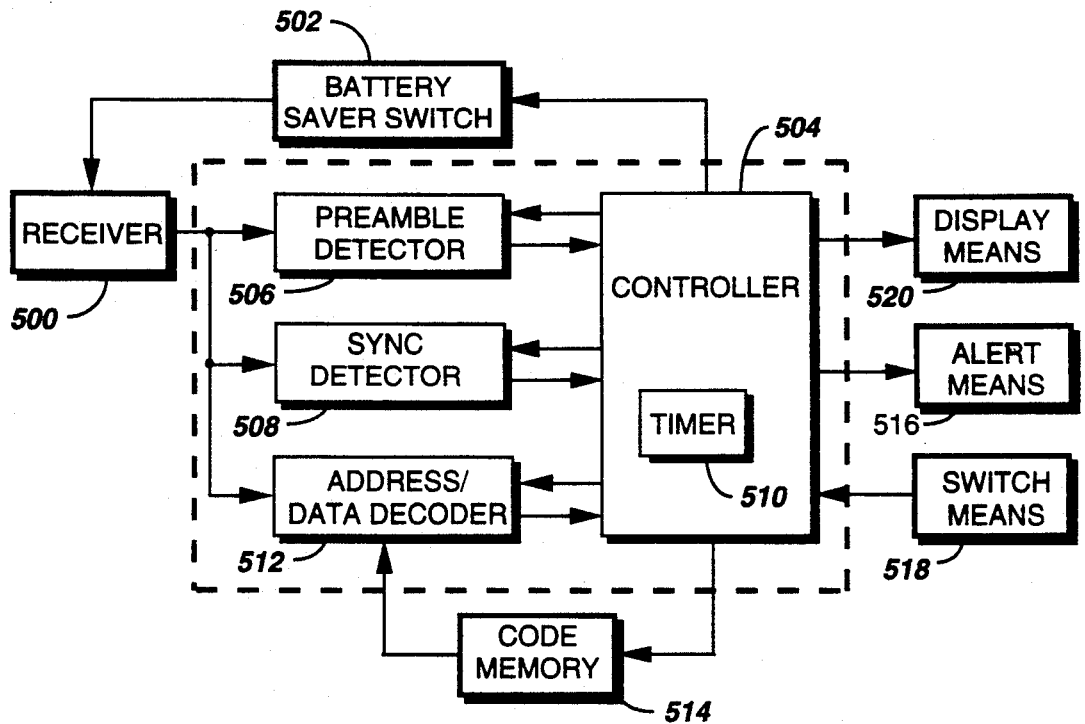
FIG. 5 is an electrical block diagram of the selective call receiver of the present invention providing extended battery saving capability.

FIG. 5 is an electrical block diagram of the selective call receiver of the present invention having improved battery saving performance. The ordered batch transmission sequence is received by receiver 500 which provides at the output a stream of binary information corresponding to the transmitted batch information. The receiver of the preferred embodiment of the present invention is a conventional frequency modulated (FM) receiver which is well known in the art. The supply of power to the receiver 500 is controlled by battery saver switch 502 under the control of the controller 504, which in the preferred embodiment of the present invention controls the entire operation of the paging receiver, as will be described below. When power is initially supplied to the receiver 500, the controller 504 enables the preamble detector 506 so that the presence of a preamble transmission can be detected on the channel. When preamble is detected on the channel, the controller 504 disables the preamble detector 506, and enable the sync detector 508. The sync detector 508 is enabled until the synchronization code word is detected, or until a timeout occurs indicating the preamble search mode is to be re-established. When the synchronization code word is detected, a clock in timer 510 is synchronized in a manner well known in the art. The controller 504 disables the sync detector 508 and enables the address/data decoder 512 and enables the reading of a stored ordered batch identifier code word from code memory 514 to be loaded into the address/data decoder 512. Upon detection of the ordered batch identifier code word in the transmitted batch information, the controller 504 switches to the extended battery saving mode as described above. When an address assigned to the paging receiver is detected by the address/data decoder 512 during one of the assigned batches, the controller generates an alert signal which is coupled to an alerting means 516, alerting the paging receiver user of the reception of a message. A switch means 518, which couples to the controller, enables the paging receiver user to reset the alert signal, and also to recover the received message from memory (not shown) wherein the message is stored after being received. The message is recovered by the controller 504 from memory and displayed on a display means 520 for presentation of the message to the paging receiver user.

Figure 6:
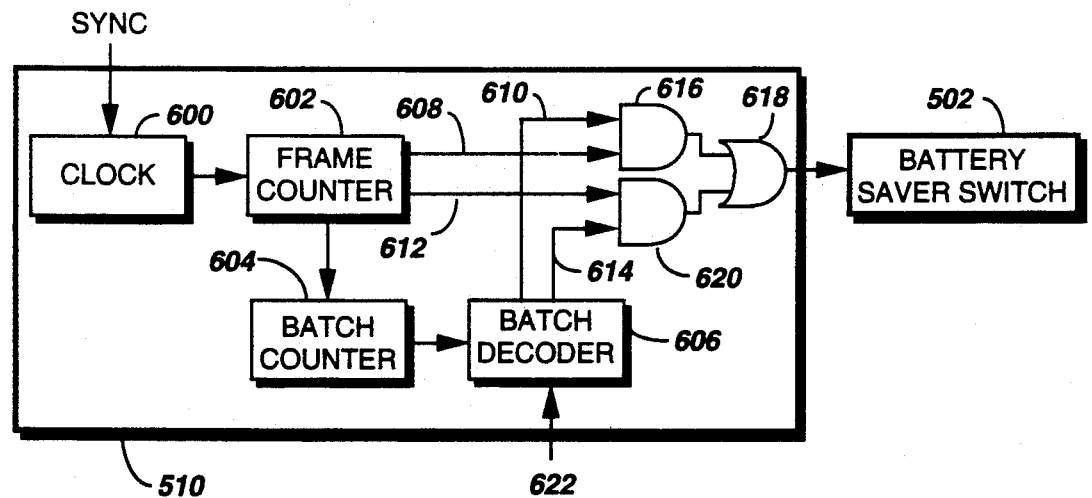
FIG. 6 is an electrical block diagram of the timing circuit providing the extended battery saving capability of the present invention.

FIG. 6 is an electrical block diagram of the timing circuit utilized to provide the improved battery saving performance described above. The timer 510 includes a clock 600 which is regularly synchronized to the received message information, as described above. The clock 600 generates timing pulses which are coupled to a frame counter 602. The frame counter has three outputs shown, two outputs 608 and 612 provide first frame and assigned frame signals, respectively. The third output generates a timing signal which couples to batch counter 604. The output of the batch counter couples to a batch decoder 606 which generates outputs for each batch that power is to be supplied to the receiver. A first output 610 of the batch decoder, indicating batch 1, is coupled to an AND gate 616 which receives a second input 608, indicating frame 1, from frame counter 602 to generate a timing pulse at the output of the AND gate 616 which is coupled to a first input of OR gate 618. OR gate 618 generates a pulse enabling the battery saver switch to supply power to the receiver during the first frame of the first batch following the preamble transmission. A second output 614 of the batch decoder, indicating the assigned batches, is coupled to an AND gate 620 which receives a second input 612, indicating the assigned frame, from frame counter 602 to generate a timing pulse at the output of the AND gate 620 which is coupled to a second input of OR gate 618. OR gate 618 generates a pulse enabling the battery saver switch to supply power to the receiver during the assigned frame and batch following the detection of the ordered batch identifier in frame 1. When the ordered batch identifier is not detected, an inhibit signal 622 is applied to the batch decoder 606, resulting in the generation of battery saver enabling pulses during each batch, as described above.

Figure 7:
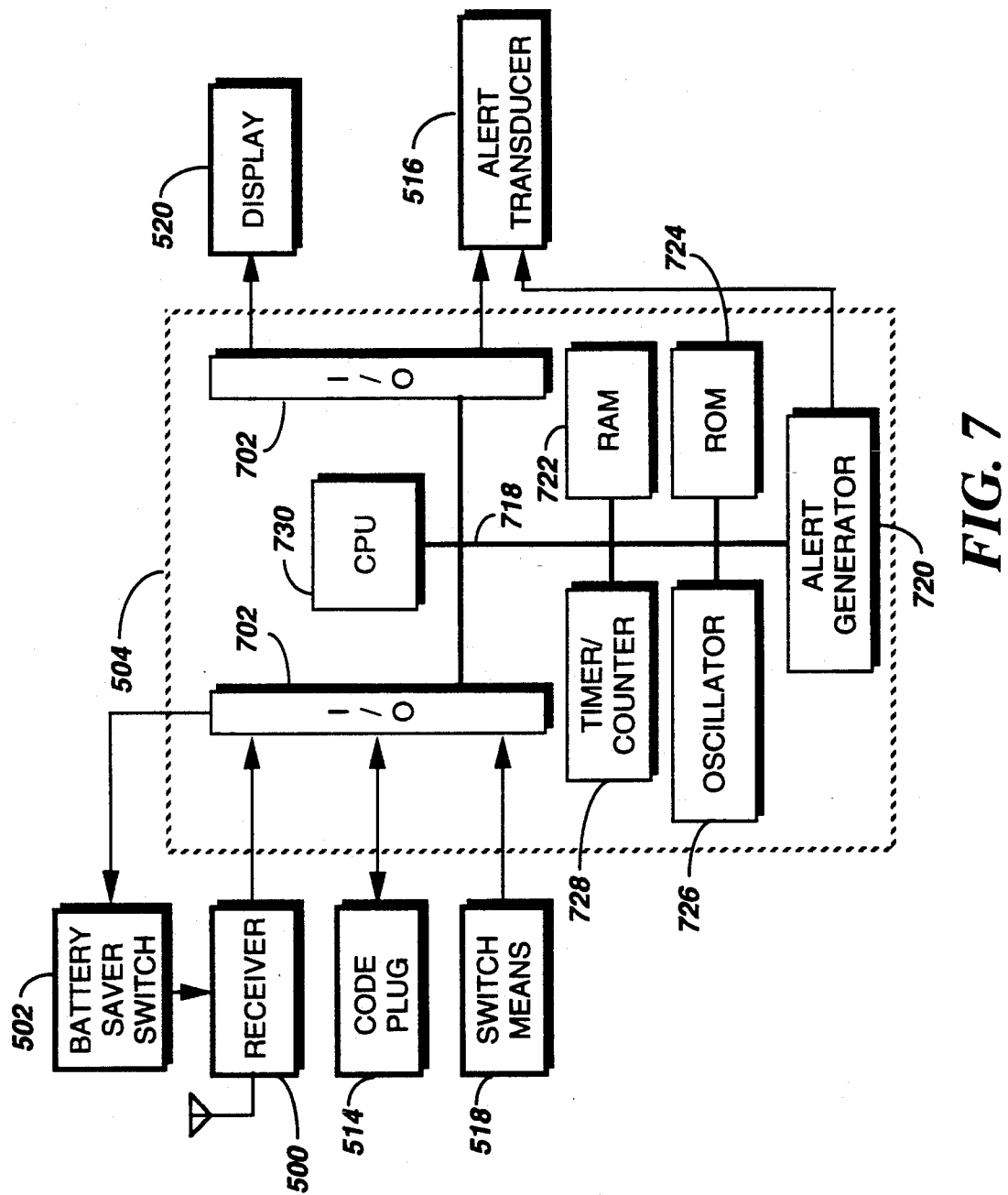
FIG. 7 is an electrical block diagram of a selective call receiver of the present invention implemented using a microcomputer to provide the extended battery saving capability.

FIG. 7 is an electrical block diagram of a selective call receiver implemented using a microcomputer to provide the improved battery saving performance of the present invention. The coded batch transmission sequence is received by receiver 500 which provides at the output a stream of binary information corresponding to the transmitted batch information. The supply of power to the receiver 500 is controlled by battery saver switch 502 under the control of a microcomputer controller 504, which in the preferred embodiment of the present invention controls the entire operation of the paging receiver, as will be described below. The microcomputer controller is preferably an MC68HC05 microcomputer, such as manufactured by Motorola, Inc. Microcomputer 504 includes a central processing unit (CPU) 730 for operational control. An internal bus 718 connects all of the elements of the microcomputer controller 504. An I/0 port 702 provides communications to the circuits external to the microcomputer controller 504. A timer/counter 728 and generates the timing signals for such functions as decoding and battery saving operation. Oscillator 726 provides the clock for operation of CPU 730, and provides the reference clock for timer/counter 728. Oscillator 726 receives the operating oscillator frequency signal from an external crystal (not shown). RAM 722 stores the messages as they are received for subsequent display as previously described. ROM 88 contains the firmware controlling microprocessor 730 operation. Programs, such as for preamble detection, synchronization code word detection, counter/timer synchronization, ordered batch identifier detection, address and message decoding, message storage and retrieval, and battery saving operation, both conventional and extended, are stored in ROM 724. An alert generator 720 provides the alerting signal in response to decoding the selective call address information.

When power is initially supplied to the receiver 500, the microcomputer controller 504 is initialized to prepare the receiver for message reception. A preamble search routine is initiated enabling the detection of a preamble transmission on the channel. When preamble is detected on the channel, the microcomputer controller 504 initiates the synchronization code word detection routine. The synchronization code word detection routine is enabled until the synchronization code word is detected, or until a timeout occurs indicating the preamble search routine is to be re-initiated. When the synchronization code word is detected, the timer/counter 728 timing signals are synchronized with the incoming data stream. The microcomputer controller 504 next initiates the ordered batch identifier detection routine and recovers the stored ordered batch identifier code word from code memory 514. Upon detection of the ordered batch identifier code word in the transmitted batch information, the microcomputer controller 504 initiates the extended battery saving routine as described above. The address detection and synchronization maintenance routines are next initiated. When an address assigned to the paging receiver is detected during one of the assigned batches, the CPU 730 enables the alert generate which generates an alert signal which is coupled to an alerting means 516, such as an alert transducer, alerting the paging receiver user of the reception of a message. The message decoding routine is then initiated, and the recovered message is stored in RAM 722. A switch means 518, which couples to the microcomputer controller 504 via the I/0 bus 702, enables the paging receiver user to reset the alert signal. The switch means 518 also enable the paging receiver user to recover the received message from RAM 722. The recovered message is displayed on the display means 520 for presentation of the message to the paging receiver user.

Figure 8A:
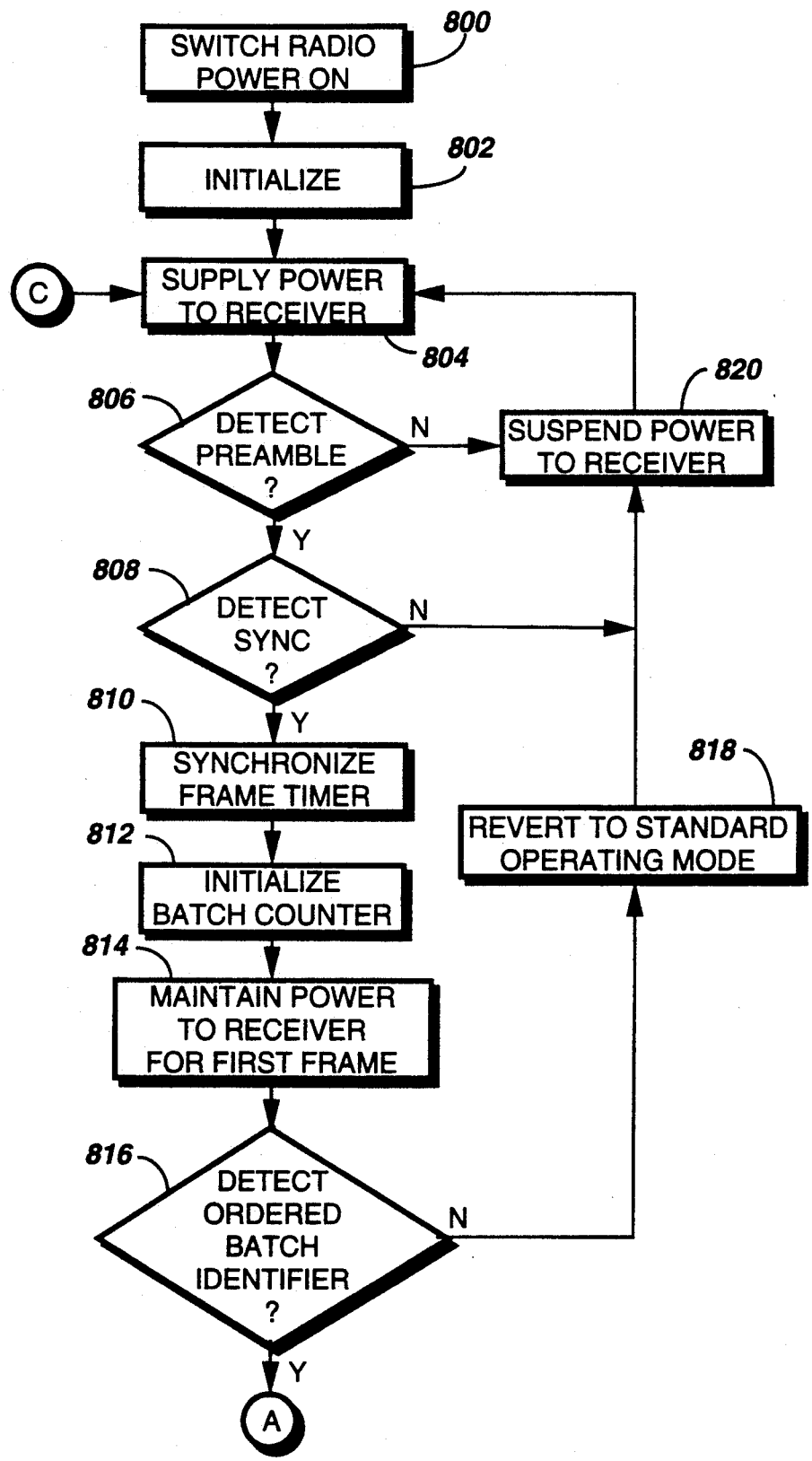
FIGS. 8A and 8B are flow charts describing the operation of the selective call receivers of the present invention to provide the extended battery saving capability.
Figure 8B:
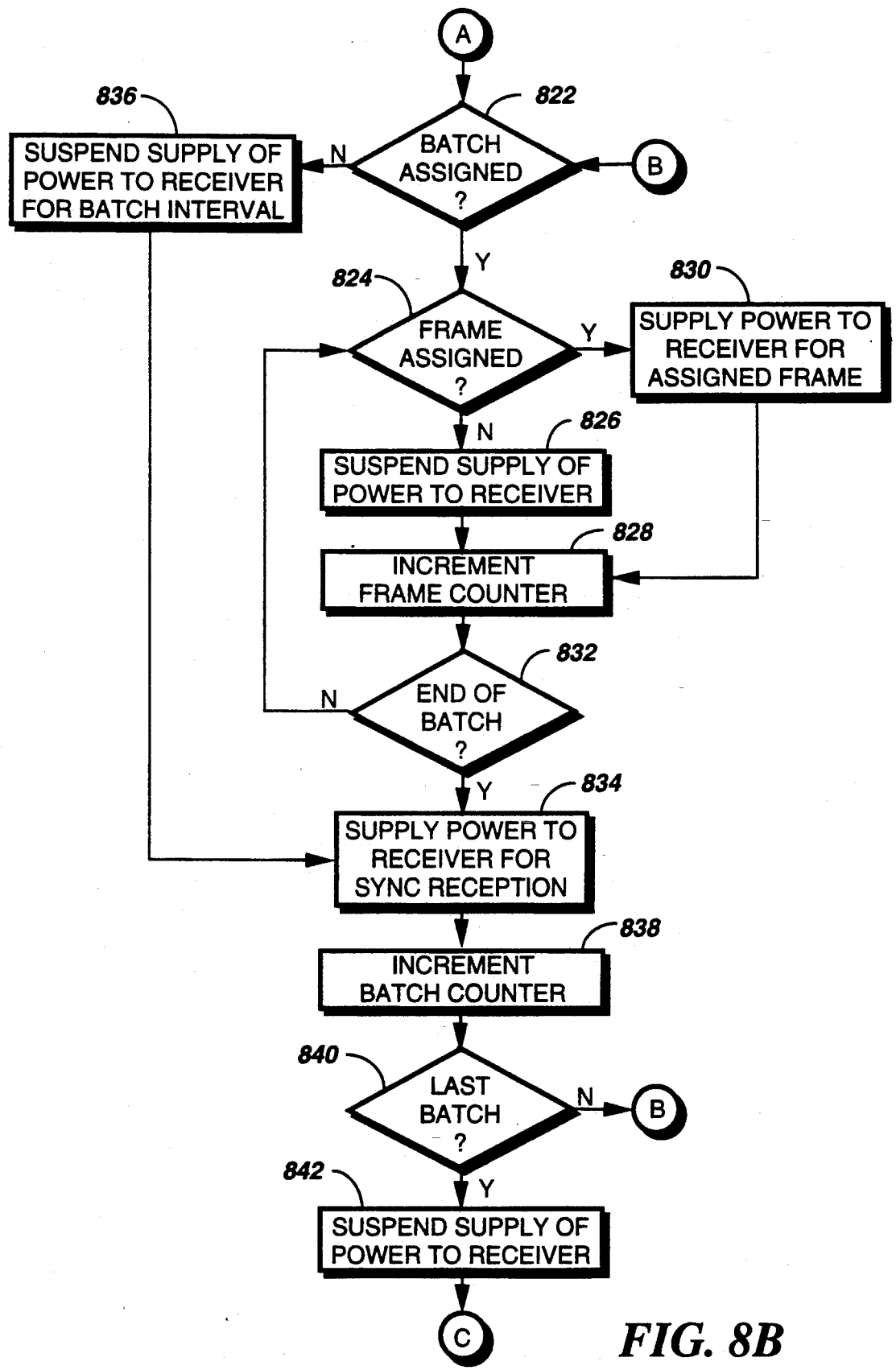

FIGS. 8A and 8B are flow charts describing the operation of the selective call receivers to provide the improved battery saving performance of the present invention. When the paging receiver is turned on, at step 800, the microcomputer controller is initialized, at step 802, as described above. Power is initially supplied to the receiver to begin the preamble search routine, at step 806. When the preamble is not detected within a predetermined period of time, at step 806, the supply of power is suspended to the receiver, at step 820, after which power is again supplied to the receiver, at step 804, after a second predetermined period of time corresponding to the well known battery saving time intervals for the selective call signaling protocol in use. When the preamble is detected during the preamble search routine, at step 806, the synchronization code word detection routine is initiated, at step 808. When the synchronization code word is not detected within a predetermined time interval, at step 808, the supply of power is suspended to the receiver, at step 820, after which power is again supplied to the receiver, at step 804, to begin the preamble search routine. When the synchronization code word is detected, at step 808, the clock oscillator is synchronized, synchronizing the frame time, at step 810. The batch counter is initialized, at step 812, and the supply of power to the receiver is maintained, at step 814, to enable detection of the ordered batch identifier code word in the first frame of the first batch. When the ordered batch identifier code word is not detected within the first frame, at step 816, the microcomputer controller reverts to the standard, or conventional battery saving mode for the signaling protocol in use, at step 818. After the entire batch has been received, power to the receiver is again suspended, at step 820, after which power is again supplied to the receiver, at step 804, to begin the preamble search routine. When the ordered batch identifier code word is detected in the first frame, at step 816, the microcomputer controller check the batch counter count to determine if the current batch is assigned to the extended battery saving group for the receiver, at step 822. When the current batch is not assigned to the receiver, at step 822, the supply of power to the receiver is suspended, at step 836, until the next synchronization code word reception is scheduled, at step 834. When the batch is assigned to the extended battery saving group, at step 822, the microcomputer controller next checks the frame counter to determine if the current frame is assigned to the receiver, at step 824. When the current frame is not assigned to the receiver, at step 824, the supply of power to the receiver is suspended, at step 826, and the frame counter is incremented, at step 828. The microcomputer controller next checks to determine if the end of the batch is reached, at step 832. When the end of the batch is not reached, at step 832, the microcomputer controller then checks if the current frame is assigned to the receiver, at step 824. When the current frame is assigned to the receiver, at step 824, the power is supplied to the receiver, at step 830, to enable reception of any address and message code words in the assigned frame. When the end of the batch is reached, at step 832, power is again supplied to the receiver for the reception of the synchronization code word, at step 834. Following the synchronization code word detection time interval, the batch counter is incremented, at step 838, after which the microcomputer controller checks to determine if the last batch has been transmitted, at step 840. When the last batch has not been transmitted, the program control returns to step 822 to determine if the next batch is assigned to the battery saving group, as described above. When the last batch has been received, at step 840, the supply of power is suspended to the receiver, at step 842, and program control returns to step 804 to begin the preamble search routine.

It will be appreciated that although the description of the program operation above is predicated on a fixed number of batches in the message transmission, other methods of identifying the end of message transmission, such as the failure to receive any synchronization or message information for a predetermined time interval, can also be used to return program control back to step 804 to again begin the preamble detection routine.

In summary, a method and apparatus for providing an extended battery saving operation for selective call receivers which are to be utilized in a convention synchronous signaling format, such as the POCSAG signaling format has been described herein. The particular method is especially advantageous in that the method does not require any changes to the conventional signaling protocol receivers already in operation within the system. Furthermore, only minimal changes are required to the paging terminal to provide the extended battery saving operation for those paging receivers capable of the extended battery saving operation of the present invention. An additional advantages is gained in that, should for any reason the paging receivers capable of extended battery saving operation fail to detect the ordered batch identifier code word identifying the current message transmission as being an ordered batch sequence, the paging receiver reverts to the conventional battery saving mode, thereby insuring that no messages intended for the paging receiver are missed.

While specific embodiments of this invention have been shown and described, further modifications and improvements will occur to those skilled in the art. All modifications which retain the basic underlying principles disclosed and claimed herein are with the scope and spirit of the present invention.

I claim:

1. A selective call receiver comprising:
    means for receiving a signal including a preamble followed by at least two message batches, a first message batch included within the at least two message batches comprising an ordered batch identifier specifying a designated message batch included within the at least two message batches; and
    means for supplying power to the selective call receiver to receive the preamble and the ordered batch identifier included within the first message batch, said means for supplying power thereafter supplying power during the designated message batch specified by the ordered batch identifier included within the first message batch.

2. The selective call receiver according to claim 1, wherein said first message batch includes a synchronization code word followed by message information, wherein the ordered batch identifier is contained in a first word of the message information, and wherein said means for supplying power supplies power to said receiving means at least during the synchronization code word and the first word of the message information.

3. The selective call receiver according to claim 2, wherein a second message batch included within the at lest two message batches comprises a synchronization code word followed by message information, and wherein said means for supplying power supplies power to said receiving means at least during the synchronization word.

4. The selective call receiver according to claim 2, wherein said means for supplying power further supplies power to said receiving means for receiving the message information during the designated message batch specified by the ordered batch identifier included within the first message batch.

5. A message transmission system comprising: transmitter means including
    means for designating at least two groups of selective call receivers,
    means for ordering for transmission the messages intended for the groups of selective call receivers into a sequence of ordered message batches,
    means for generating an ordered batch identifier identifying the transmission batch sequence as being ordered, and
    means for transmitting a preamble followed by transmitting the ordered batch identifier within a first message batch of the ordered message batch sequence; and a plurality of selective call receivers designated to operate in at least two groups, the receivers including
    means for designating a group to which each of said plurality of selective call receivers belongs,
    a receiving means,
    first means for supplying power to said receiver means for receiving and detecting the transmitted preamble followed by the ordered batch identifier transmitted within the first message batch of the ordered message batch sequence, and
    second means for further supplying power to said receiver means for receiving the message batches of the ordered message batch sequence directed to the designated group of selective call receivers, in response to the ordered batch identifier detected within the first message batch of the ordered message batch sequence.

6. The message transmission system according to claim 5, wherein said selective call receivers further comprise:
    means for detecting the absence of the ordered batch identifier; and means for supplying power to said receiver means during each batch of the ordered batch sequence.

7. The message transmission system according to claim 5, wherein said ordered batch sequence comprises a first batch including a sync word and the ordered batch identifier and message information, and at least a second batch including a sync word and message information.

8. The message transmission system according to claim 7, wherein said message information is subdivided into at least eight frames for address and message transmission.

9. The message transmission system according to claim 7, wherein the ordered batch identifier is a data codeword.

10. The message transmission system according to claim 9, wherein the ordered batch identifier is transmitted as the first word of the message information transmitted during the first batch following the preamble transmission.

11. A selective call receiver for operation in a communication system transmitting messages for at least two receiver groups, the messages including a preamble followed by an ordered batch identifier within a first message batch of a sequence of ordered message batches, said selective call receiver comprising:
means for designating one of at least two groups to which the selective call receiver belongs,
a receiving means,
means for supplying power to said receiver means for receiving and detecting the transmitted preamble followed by the ordered batch identifier transmitted within the first message batch of the ordered message batch sequence, and
means, responsive to the ordered batch identifier detected within the first message batch of the ordered message batch sequence, for further supplying power to said receiver means for receiving the batches of the ordered batch sequence directed to the designated group of selective call receivers.

12. The selective call receiver according to claim 11, wherein said means for designating comprises a code memory for storing a predetermined ordered batch identifier code word.

13. The selective call receiver according to claim 11, wherein the message batches include a synchronization code word followed by at least eight frames for address and message transmission, and wherein the ordered batch identifier is transmitted in the first frame of the first message batch.

14. The selective call receiver according to claim 13, wherein said means for supplying power supplies power to said receiving means at least during the synchronization code word during each of the sequence of ordered message batches.

15. The message transmission system according to claim 11, wherein said selective call receivers further comprise:
means for detecting the absence of the ordered batch identifier; and
means for supplying power to said receiver means during each batch of the ordered batch sequence.

* * * * *